March 15, 1966     C. M. ASHLEY ET AL     3,240,024
FREEZE CRYSTALLIZATION SEPARATION SYSTEMS
Filed Nov. 8, 1961     2 Sheets-Sheet 1

INVENTOR.
CARLYLE M. ASHLEY.
CYRUS M. BOSWORTH.
BY Frank N. Decker Jr.
ATTORNEY.

March 15, 1966     C. M. ASHLEY ET AL     3,240,024
FREEZE CRYSTALLIZATION SEPARATION SYSTEMS
Filed Nov. 8, 1961     2 Sheets-Sheet 2
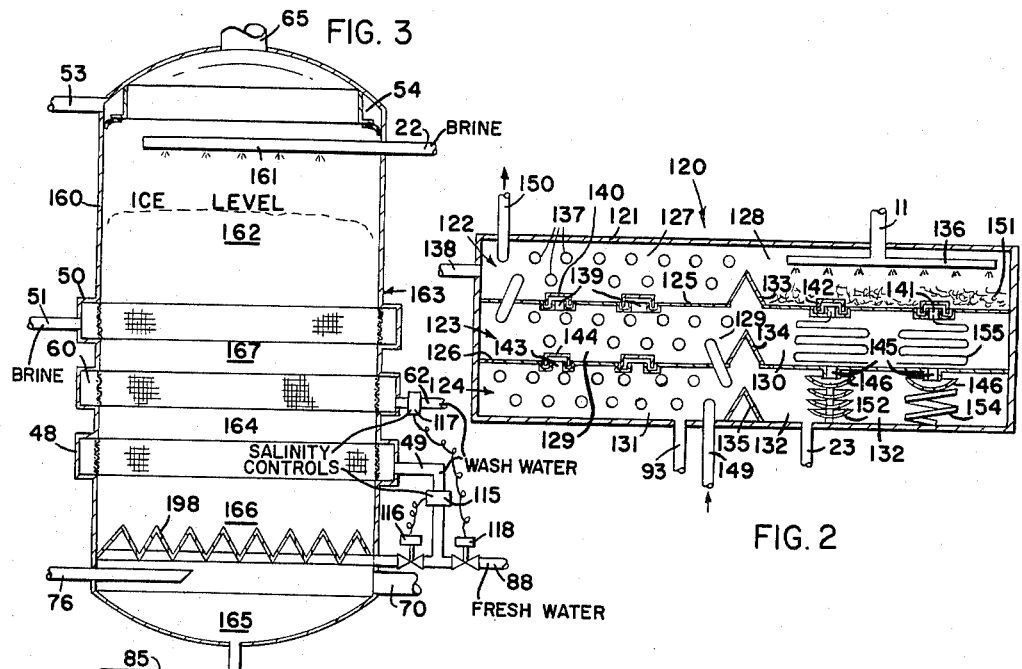
FIG. 3
FIG. 2
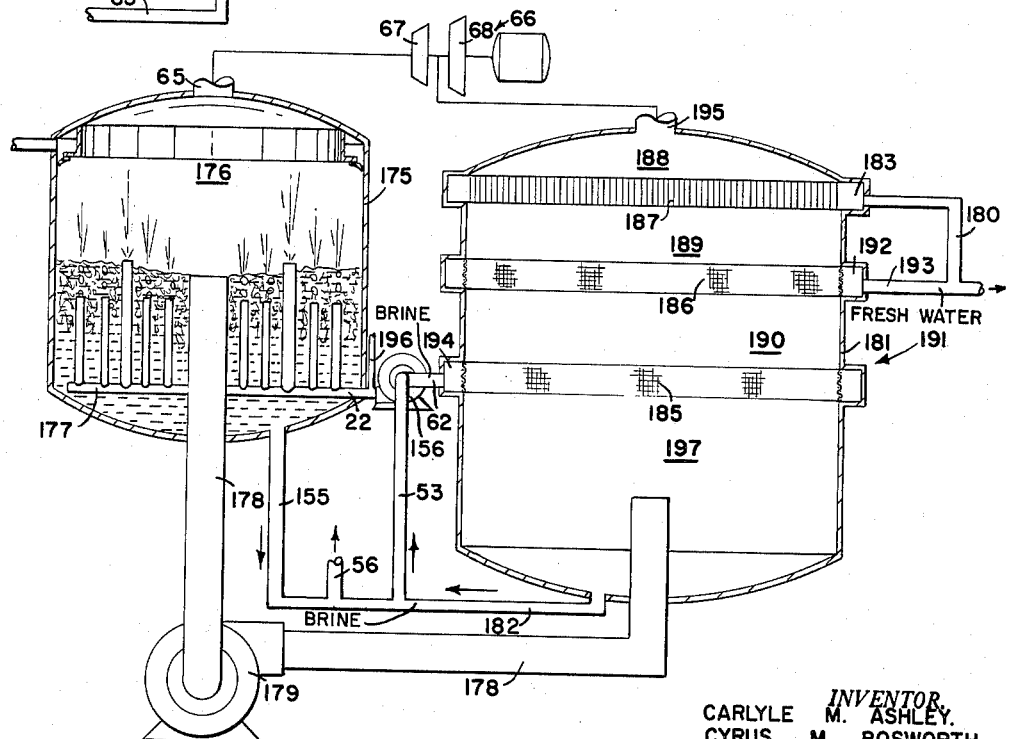
FIG. 4
INVENTOR.
CARLYLE M. ASHLEY.
CYRUS M. BOSWORTH.
BY
ATTORNEY.

United States Patent Office 3,240,024
Patented Mar. 15, 1966

1

3,240,024
FREEZE CRYSTALLIZATION SEPARATION
SYSTEMS
Carlyle M. Ashley, Fayetteville, and Cyrus M. Bosworth,
De Witt, N.Y., assignors to Carrier Corporation, Syracuse, N.Y., a corporation of Delaware
Filed Nov. 8, 1961, Ser. No. 150,980
7 Claims. (Cl. 62—58)

This invention relates to apparatus including systems and components for the separation of the solvent and solute components of a solution. More specifically, this invention relates to an improved type freeze separation process and system including associated components which is adapted to convert saline water to fresh water.

Because of rapidly diminishing adequate supplies of fresh water and rapidly increasing demands for it, serious and concerted attention is being given to the problem of converting sea water into fresh water for human needs. A consistent objective has been to reduce the cost of presently known processes and the development of new processes which are capable of achieving the desired objective at cost levels which will render it economically feasible. However, such factors as equipment, capital costs, operating costs and power consumption requirements have decreased the attractiveness of many proposed systems and militated against the wide-spread use of sea water conversion plants in areas of fresh water need.

Accordingly, it is an object of this invention to provide an improved system as well as improved components and an improved method which is adapted to purifying sea water at reduced costs.

Thermodynamically, the energy required to freeze sea water and form ice, which may be subsequently melted to provide pure water, is basically not greater than the energy which would be required to achieve the same result by a distillation method, but a freezing proces may have a higher efficiency of energy utilization than a distillation method, making it economically more attractive. However, the problems involved in separating ice from the remaining brine, in the past, have led to difficulties which render such systems less attractive than at first supposed. Separation schemes have been proposed which raised the capital cost of a saline water conversion plant and which have required substantial pumping power which tended in some measure to offset the inherent thermodynamic advantage of the freeze process.

It is, therefore, a further object of this invention to provide an improved freezing separation apparatus and method which combines the functions of previously separate components and which effectively reduces operating costs and pumping power required in a separation system.

Another difficulty which has plagued many prior freezing separation attempts at economically converting sea water to fresh water has laid in the design of a system which utilizes a suitable refrigerant. This problem has been particularly acute in saline water conversion systems because of the toxicity, water solubility and inflammability of many conventional refrigerants. For example, many halogenated hydrocarbon refrigerants break down and form acids such as hydrochloric or hydrofluoric acids in the presence of water, which rapidly attack pumps, bearings and other metal surfaces of pipes and vessels required in a sea water conversion plant. Also, unhalogenated hydrocarbons are flammable and may form explosive mixtures, making their use undesirable. Also, some unhalogenated refrigerant compounds, which have looked promising as refrigerants, have proved unsatisfactory in practice due to their tendency to form hydrates or other compounds with the constituents of the sea water.

2

This tendency to react with sea water has resulted in raising the cost of separation due to the great difficulty of washing the frozen hydrate crystals free of adhering contaminating brine in order to obtain fresh water, partially because of the small size of the hydrate crystals which are formed.

Accordingly, it is a still further object of this invention to provide an improved refrigerent and freezing separation system combination which overcomes disadvantages of prior combinations.

Another object of this invention is to provide an improved heat exchange system for precooling solution passed to a separation system.

It is another object of this invention to provide an improved heat exchange system which is adapted to remove air or other dissolved noncondensible gases from solution being separated in order to improve the effectiveness of the separation system.

In one embodiment of the invention herein described, sea water or other solution is precooled and passed to a freezing zone wherein it is mixed with octafluorocyclobutane which is used as a refrigerant. The octafluorocyclobutane is highly stable, noninflammable, nonreactive with sea water, completely nontoxic, and possesses other uniquely desirable features which adapt it for use in a system of the type described. This refrigerant is then evaporated from the sea water to cool it and freeze ice therefrom.

The ice is then passed to a combination separator, melter and condenser which may be embodied in a single vessel with the freezer. The refrigerant is compressed in the first stage of a centrifugal compressor and a portion of the compressed refrigerant is discharged into the condensing zone where its heat is given up to ice in the separation chamber to melt the ice and form fresh water. Another portion of the compressed refrigerant is passed to a second stage of the centrifugal compressor and condensed in an auxiliary condenser. The condensed refrigerant portions are then returned to the freezing zone for reuse. Suitable strippers are provided to reclaim refrigerant which remains in the product fresh water and waste brine solutions discharged from the system. In addition, one embodiment of this invention contemplates the use of a heat exchanger wherein the refrigerant, octafluorocyclobutane, is utilized as a direct contact heat exchange medium between incoming sea water and effluent brine and product water liquid in order to recover as much of the energy as possible that was used for cooling the effluent solutions.

A modified embodiment of this invention includes a combination deaerator and sea water precooler comprising a plurality of successively lower pressure vapor stages which serves as a heat exchanger to cool the sea water input thereby recovering some of the energy utilized to cool brine and product water solutions while at the same time removing a quantity of fresh water from the sea water input.

Other modifications and embodiments of this invention and additional objects thereof will become apparent by reference to the following specification and drawings wherein:

FIGURE 2 illustrates a modified heat exchanger and deaerator adapted to precool sea water supplied to a saline water conversion system of the freeze-type and which is also adapted to provide a quantity of fresh water prior to the freezing stage;

FIGURE 3 illustrates a cross-sectional view of a modified unitary freezer, separator, melter and condenser vessel; and FIGURE 4 illustrates a further modified two-vessel freezer; separator, melter, and condenser combination.

Figure 1:
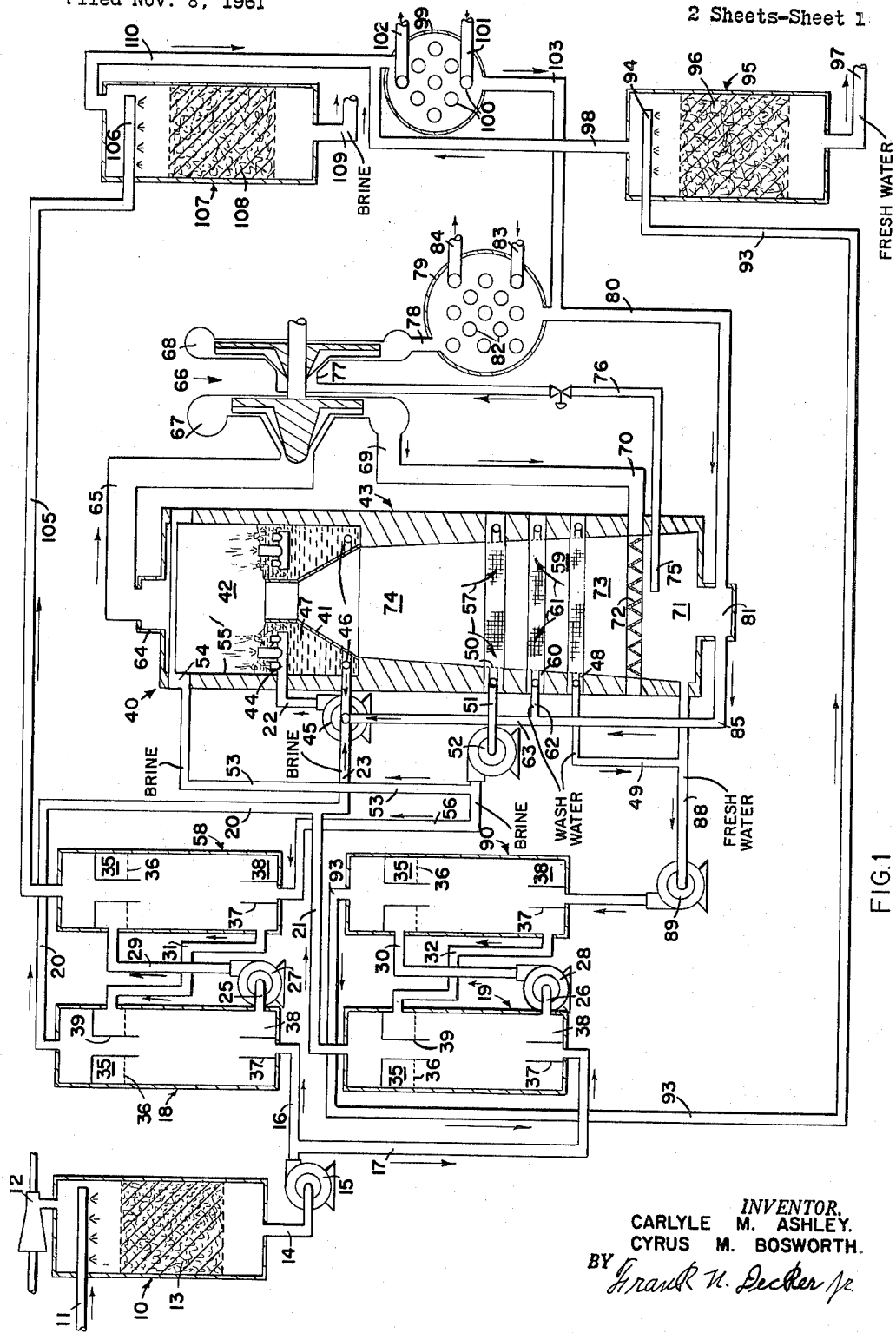
FIGURE 1 is a schematic flow diagram through a freeze-type saline water conversion system or plant in accordance with this invention and illustrating, by cross-sectional views, a construction of a combination freezer, separator, melter and condenser vessel suitable for use with the system.

Referring to FIGURE 1, there is shown a system wherein sea water in introduced into deaerator 10 through sea water feed line 11 and a suitable spray header disposed within the deaerator vessel. It will be appreciated that the systems and components herein described are explained with reference to a saline water conversion plant for providing fresh or potable water, but in its broader aspects the invention relates to the general separation of the solvent and solute components of a solution. In the case of the system to be described, the principal solvent is water and the principal solute is sodium chloride, but other solvent-solute combinations which have a vapor pressure suitably lower than that of the refrigerant employed may be separated in a similar separation system, and it will be understood that appropriate modifications, if necessary, may be made to this system to adapt it to use in separating the components of other solutions.

A suitable purge 12, such as a steam jet ejector or vacuum pump, is provided to remove noncondensible gases from sea water introduced into deaerator 10. The deaerator comprises a vessel having a packing 13 of any suitable material such as Raschig rings which serves to provide a large wetted surface to promote removal of dissolved noncondensible gases from the sea water by the purge unit. The deaerated sea water is passed through line 14 by feed pump 15 and lines 16 and 17 to inlet heat exchangers 18 and 19. Inlet heat exchangers 18 and 19 each comprise a vessel forming a compartment through which the sea water is passed and cooled by direct contact with a heat exchange medium. The cooled sea water is then passed from the inlet heat exchangers through lines 20 and 21 to line 23.

The construction of inlet heat exchangers 18 and 19 as well as the construction of their associated effluent liquid heat exchangers is similar. Accordingly, similar reference characters have been used to designate corresponding parts, and only one heat exchanger need be described in detail.

Heat exchanger 18 has a heat exchange medium outlet line 25 which conducts heat exchange medium through pump 27 and line 29 to associated effluent heat exchanger 58. A line 31 conducts cooled heat exchange fluid from the associated effluent heat exchanger 58 to an inlet header 35 adjacent an upper region of heat exchanger 18.

The heat exchange medium employed may be any suitable, stable nonreactive, nontoxic, insoluble and noncorrosive liquid. It has been found, however, that for the purposes of this invention, octafluorocyclobutane, having the formula $cC_4F_8$, which may also be used as the refrigerant in the freezer section of the system, is a particularly suitable heat exchange medium.

The cooled octafluorocyclobutane heat exchange medium is passed into header 35 and distributed through a distributor 36, such as a perforated metal plate, in small droplets adjacent the upper portion of the interior compartment of heat exchanger 18. The heat exchange medium being heavier in this example than sea water, passes downwardly through the interior compartment of the heat exchanger and is thereby intimately associated in direct contact with the sea water.

Since the small droplets of the heat exchange medium present a relatively large surface for contact with the sea water, and since the heat exchange medium is relatively cold due to its contact with effluent liquid in heat exchanger 58, the sea water in the interior of heat exchanger 18 is cooled to a very small temperature difference from the temperature of the heat exchange medium and the effluent liquid. Consequently, the direct contact type heat exchangers using the heat exchange medium described are capable of providing superior heat transfer without the necessity of expensive internal tubing or other constructions which materially add to the capital cost of the system.

Adjacent the lower region of heat exchanger 18 is disposed a riser pipe 37 which forms a collection chamber or sump 38 for the collection of the warmed droplets of heat exchange medium which fall by gravity into the sump and replace the sea water therein. The heat exchange medium is then passed from the lower region of the heat exchanger through line 25 to effluent heat exchanger 58. The sea water is passed from line 16 through riser 37 into the heat exchanger. The cooled sea water is passed through riser 39 adjacent the upper portion of heat exchanger 18 through lines 20, 21 and 23, to a freezing zone 42.

In a similar manner, another portion of the sea water which has been deaerated in deaerator 10 is passed through line 14 and pump 15 through line 17 to inlet heat exchanger 19 where it is passed into direct contact heat exchange relationship with octafluorocyclobutane which has been cooled in effluent heat exchanger 90. From inlet heat exchanger 19 this portion of sea water is passed through line 21 to line 23.

The cooled and deaerated sea water is passed from line 23 by pump 45 to submerged spray header 44 of a single shell freezer, melter, separator, washer and condenser vessel 40.

As shown, vessel 40 comprises a vertical, cylindrical shell having a partition 41 dividing it into an axially aligned communicating freezing zone or chamber 42 and a separating zone or chamber 43. Vessel 40 may desirably be either circular or rectangular in cross-section. Partition 41 forms, in the illustrated embodiment, a sump 47 in which is disposed partly submerged spray header 44 and a brine and refrigerant collector header 46. Spray header 44 has a plurality of nozzles therein submerged slightly below the level of liquid in sump 47 and may have a plurality of nozzles formed by risers extending above the liquid level, as illustrated in the drawing. The nozzles serve to project upwardly in the freezing zone 42, both directly and by induction, a substantial quantity of sea water and refrigerant, thereby greatly increasing the exposed surface area of these liquids in the interior of the freezing chamber to promote vaporization of the refrigerant from the mixture.

A quantity of a suitable refrigerant medium is introduced into freezing zone 42 through spray header 44. The refrigerant employed should have a substantially higher vapor pressure than solution introduced into the freezing zone. The refrigerant should also be preferably immiscible with and insoluble in the solution and should not react or decompose at the temperatures to which it is subjected in the system. In the case of a saline water conversion plant, it is apparent that the refrigerant should also be completely nontoxic and preferably noninflammable under any condition normally encountered. One of the serious problems, heretofore, in the selection of refrigerant for a saline water conversion system has been the tendency of refrigerants to react and form hydrates, acids, or other compounds which impair or render the refrigerant unsuitable for its intended purpose. Often, these by-poducts are corrosive and attack surfaces in the system components and may impair heat transfer or cause other malfunctioning of the system.

For these reasons, the refrigerant employed in the system herein described is preferably octafluorocyclobutane ($cC_4F_8$), which has been previously described as being a desirable heat exchange medium for use with the inlet heat exchangers 18 and 19. Octafluorocyclobutane is substantially immiscible with water and has a very low solubility in water. Therefore, a mixture such as an emulsion of octafluorocyclobutane and water is easily separated by decanting. This material is substantially completely nontoxic and is not flammable under normally encountered conditions in the plant described. This refrigerant possesses the very substantial advantage, in addition to those described above, of having high molecular weight and being especially adaptable to use with centrifugal refrigeration systems wherein its properties may be utilized to great advantage in conjunction with a relatively low cost centrifugal compresser. In addition, the use of octafluorocyclobutane in both the inlet heat exchangers and as a refrigerant makes it unnecessary to prevent carry-over of the heat exchange medium into the freezer. Also, the boiling point at atmospheric pressure of octafluorocyclobutane is slightly below the temperature in the freezer, thereby permitting the freezer to operate at a low positive pressure relative to atmospheric pressure, thereby minimizing the thickness of shells required and also the danger of leakage.

A recirculating brine pump 45, in addition to passing sea water from line 23 through line 22 to spray header 44, also serves to recirculate brine and refrigerant collected in the bottom of sump 47 by collector 46 and recirculating it to spray headers 44 so as to maintain continuous fountains of refrigerant brine mixture in the interior of freezing chamber 42. The nature of the mixture of refrigeant and brine or other solution in the freezer will depend on the particular compositions involved as well as the amount of the agitation to which they are subjected. For example, the mixture may actually comprise an emulsion or a solution, or a rapidly separating suspension of refrigerant and the solution to be purified. In some instances, water may comprise the refrigerant where the solution being separated is an aqueous brine solution thus giving rise to a refrigerant and solution mixture which comprises a true solution.

In operation, refrigerant is evaporated from the sea water or brine mixture contained in freezing zone 42 thereby freezing a portion of the water component of the solution therein. The ice and brine mixture overflows the upper portion of partition means 41 which serves as a weir to maintain the desired solution level in the freezing zone. This mixture or slurry of ice and brine falls into separating zone or chamber 43 wherein the ice and brine are separated from each other.

Separating chamber 43 may be circular in cross-section although it may be rectangular or take other shapes according to the particular design considerations involved in the system. This chamber may also have slightly tapered walls, as shown in FIGURE 1, if desired. Separating zone 43 is provided with one or preferably three collectors or headers which are designated in the drawing 60, 50 and 48. These collectors may comprise a wire screen, perforated plate or louvered metal with narrow recessed slits adapted to pass liquid but not ice and a suitable liquid collecting ring about the periphery of its associated vessel. Collector 50 is spaced from freezing zone 42 and may comprise a plate having perforated openings in the side walls of the separating zone for the passage of liquid therethrough.

The system described, which utilizes partially submerged jets or nozzles in spray header 44 to provide a large surface area in freezer 42 characteristically results in the production of relatively large easily washed ice crystals. If large accumulations of ice were permitted to build up on the walls 55 of the freezing zone, the transfer operation of slurry from the freezing zone into the separation zone might be impaired. Accordingly, brine collector 50 communicates with a line 51 and pump 52 from which a portion of the brine is forwarded through line 53 to an inlet 54 at the top of freezing zone 42. Inlet 54 comprises a weir to provide a quantity of brine flowing downwardly over the sides 55 of freezing zone 42 in order to scrub the sides clean of ice and prevent the accumulation thereon of an undesirable quantity of ice.

In operation, pump 52 induces a downward flow of brine generally in the direction of the arrows 57 through the ice mixture in a brine removal zone 74 of separating chamber or zone 43 and into brine collection header 50.

A wash water collector header 60 is provided in separating zone 43 and is spaced from the lower end of that zone. As will be subsequently described, ice is melted at the lower portion of vessel 40, and a quantity of this water is induced upwardly from the bottom of the separating zone as illustrated by arrows 61 through the ice and is carried off through water collector 60. The wash water serves to displace brine adhering to the surfaces of the ice in the separating zone and, therefore, to improve the purity of the product water. This diluted wash water or weak brine solution is then forwarded through lines 62 and 63 into recirculating brine pump 45 where it is returned to the freezing zone to conserve the efficiency of the system. Alternatively, if the salinity of the water withdrawn through header 60 is not too great for the desired average concentration of salt in the product, then line 62 may be connected to the product water line 88 if desired.

As also illustrated in FIGURE 1, vessel 40 may include a wash water collector header 48 which serves to siphon off the relatively fresh water which tends to flow up the walls which form the sides of vessel 40 and to create a pressure drop from the center of vessel 40 towards its sides to displace brine from the interstices of the ice and replace it with fresh water. Wash water collector 48 and diluted brine or wash water collector 60 are spaced from the end of separating chamber 43 in order to permit wash water to flow through the ice crystals in the lower portion of the separating zone to provide adequate washing of the ice. Consequently, a portion of separating zone or chamber 43, in the region below wash water collector 60, comprises a washing zone 59. The relatively pure water collected by header 48 may be forwarded through wash water line 49 from which it becomes a part of the effluent product water.

Vessel 40 also has disposed therein adjacent its lower portion a melter and condenser partition plate 72. Partition plate 72 is disposed generally transversely of the vertical axis of vessel 40 thereby forming a condensing zone or chamber 71 in axial alignment with adjacent separating zone 43 and freezing zone 42. Plate 72 may comprise a discontinuous member having transversely extending zig-zag corrugations providing an extended heat transfer surface with perforations or other suitable opening means formed adjacent its lower V-shaped portion in order to afford communication between separating zone 43 and condensing zone 71. The upper surface of plate 72 provides melting surfaces, as shown in the drawings, in heat transfer relation with the washed ice at the bottom of separating zone 43 and its lower surfaces are in heat transfer relation with condensing zone 71.

As shown in FIGURE 1, the freezing zone 42 and the separating zone 43, including the brine removal zone 74, the washing zone 59, and the condensing zone 71, may be each axially aligned in a vertical column. Vessel 40 is provided with a vapor outlet 64 adjacent the upper portion of freezing zone 42. Vapor outlet 64 passes refrigerant vapor from freezing zone 42 through vapor conduit 65 to a compressor 66. Compressor 66 may desirably comprise a two-stage centrifugal compressor having a first stage 67 and a second stage 68 driven by a steam turbine or other suitable means (not shown). Vapor conduit 65 is connected to the inlet of first stage 67 where the refrigerant is compressed and discharged through outlet 69 of the first stage of the compressor. Outlet 69 is in communication by means of a conduit with vapor inlet 70 of condensing zone 71.

Compressed refrigerant vapor is, therefore, discharged from the first stage of compressor 66 under the lower surface of plate 72. Since the upper surface of plate 72 is in heat exchange relation with ice in washing zone 59, refrigerant vapor passed to condensing zone 71 by compressor 66 will be at least partially condensed on the lower surface of plate 72. At the same time, the refrigerant vapor will give up its heat to plate 72 which has its upper surface in heat exchange relation with ice in washing zone 59. Consequently, a portion of the ice in the washing zone will melt as the refrigerant condenses and the water thus produced will flow through the perforations in plate 72 and be collected in the lower portion of condensing zone 71 with the condensed refrigerant. To some extent, actual contact between compresser refrigerant vapor and washed ice in zone 59 may be effected through the perforations in plate 72 to achieve a similar result. Consequently, condensing zone 71 will contain both liquid refrigerant and fresh water. The lower portion of washing zone 59 adjacent plate 72 therefore comprises a melting zone 73.

Since, however, the compressor does work on the compressed gas, thereby heating it up, there will be insufficient cooling available at plate 72 to condense all of the refrigerant evaporated from freezing zone 42. Consequently, a collection header 75 for uncondensed refrigerant vapor is provided adjacent the upper portion of condensing zone 71. The refrigerant vapor collected by collector 75 is passed through line 76 into inlet 77 of second stage 68 of compressor 66. This vapor is then additionally compressed by second stage 68 of the compressor and passed through outlet line 78 to auxiliary condenser 79. A suitable control valve in line 76, responsive to ice build-up in vessel 40, may be provided to control the quantity of uncondensed vapor removed from region 71.

Auxiliary condenser 79 comprises a shell having a plurality of heat exchange tubes 82 therein including an inlet line 83 and an outlet line 84 for the passage of a heat exchange fluid or other cooling medium such as sea water. Alternatively, the second stage 68 of the compressor may be omitted and heat exchange tubes 82 may comprise the evaporator of an auxiliary refrigeration system wherein refrigerant is used to cool the heat exchange tubes and condense the uncondensed refrigerant directly.

The portion of the refrigerant vapor which is passed to auxiliary condenser 79 is condensed therein and passed through line 80 to a refrigerant collection vessel such as refrigerant collection sump 81 located adjacent the lower portion of vessel 40. Since octafluorocyclobutane, which is the preferred refrigerant in this system, is heavier than water, the lower portion of condensing zone 71 serves as a decanting vessel to separate refrigerant from the fresh water produced by the saline water conversion plant. The refrigerant collects in the bottom of sump 81 and is forwarded through line 85 back to recirculation pump 45 along with that portion of dilute wash water which is collected by collector 60 and passed through line 62 to line 85.

The fresh water which floats at the top of the liquid in condensing zone 71 is conducted through line 88 and fresh water pump 89 to fresh water effluent heat exchanger 90. The internal construction of heat exchanger 90 is similar to that previously described in connection with heat exchanger 18. Fresh water entering adjacent the lower portion of heat exchanger 90 passes up through riser pipe 37 and out of heat exchanger 90 through line 93 which is in communication with the interior of the heat exchanger vessel at a point adjacent its upper region. Liquid octafluorocyclobutane or other suitable heat exchange medium is passed into heat exchanger 90 through line 30 connected to the interior of the heat exchanger adjacent its upper region. The octafluorocyclobutane is distributed into the interior of the heat exchanger through perforated plate 36 of header 35. This refrigerant passes downwardly in counterflow to the direction of effluent product water passing through the heat exchanger. The octafluorocyclobutane is therefore cooled by direct contact with relatively cool effluent product water and is collected in sump 38.

From sump 38 the octafluorocyclobutane is passed through line 32 to header 35 of inlet heat exchanger 19. The cooled octafluorocyclobutane is distributed by header 35 and perforated plate 36 of heat exchanger 19 and passed downwardly through the heat exchanger in direct contact with upwardly flowing sea water. Since the sea water passing upwardly in heat exchanger 19 is relatively warm, the octafluorocyclobutane absorbs heat from the sea water thereby precooling it in order to reduce the amount of heat required to be extracted from the sea water when it is passed through line 21 to freezing chamber 42. This serves to conserve the power required to be supplied to compressor 66 in order to form ice in the freezing zone. The warmed octafluorocyclobutane heat exchange medium is collected in sump 38 of inlet heat exchanger 19 and passed through line 26 which is connected to the heat exchanger adjacent its lower region and passed through pump 28 and line 30 to header 35 of effluent heat exchanger 90. As previously explained, the octafluorocyclobutane gives up its heat to the effluent product water in heat exchanger 90 and then is returned back to inlet heat exchanger 19 to cool the sea water supplied to freezing zone 42.

Since the heat exchangers are of the direct contact type, only a very small temperature differential will exist between the heat exchange medium, and the inlet and effluent fluids in heat exchangers 19 and 90, thereby providing extremely efficient heat exchange without requiring the provision of expensive heat exchange tubing in the heat exchangers. Furthermore, since the octafluorocyclobutane is completely stable, nontoxic, nonreactive and relatively insoluble in water, it is a particularly desirable heat exchange medium and presence of small quantities of it in the effluent product water could be tolerated.

However, since octafluorocyclobutane is somewhat expensive and its loss from the system would increase operating costs, it is desirable to provide means for stripping it from the effluent product water. For this purpose, line 93 passes product water to spray header 94 located in stripper 95. Stripper 95 may comprise a vessel having an interior packing 96 of Raschig rings or other suitable material and may be generally similar to deaerator 10 in construction. The product water passed thereto wets the surface of packing 96. A low pressure is provided in the interior of stripper 95 by a line 98 communicating with the stripper adjacent its upper portion, which in turn is in communication with a condenser 99.

Condenser 99 may comprise a shell having disposed therein a plurality of heat exchange tubes 100 connecting with an inlet line 101 and an outlet line 102 for piping of a suitable cooling medium. Heat exchange tubes 100 may desirably be connected in series or parallel with heat exchange tubes 82 of condenser 79 so that a single cooling medium may be used in both condensers 99 and 79 for condensing refrigerant vapor. Since condenser 99 operates at a relatively low internal pressure, octafluorocyclobutane will be evaporated from product water supplied to stripper 95 and will be condensed in condenser 99 where it is passed through outlet line 103 and line 80 to refrigerant sump 81. Because, however, the strippers must operate at a very low pressure it may be necessary to provide a compressor between lines 98, 110 and condenser 99 if the temperature of the cooling medium is not sufficiently low to provide the desired low pressure in the strippers. The fresh product water, after passing through packing 96 and having the octafluorocyclobutane stripped therefrom, is passed from stripper 95 through line 97 to a desired location for use.

Accordingly, it will be observed that it is advantageous to utilize octafluorocyclobutane both as the refrigerant and as the heat exchange medium in the inlet heat exchangers because of the ease with which it may be handled in the system. If another heat exchange medium is used in the inlet heat exchangers, the system may be appropriately modified so as to return the heat exchange medium stripped from the effluent product back to the heat exchangers and to strip solution forwarded to the freezer.

As previously explained, pump 52 forwards a portion of the brine collected by brine collector 50 in separation zone 43 through line 53 back to freezing zone 42. The other portion of the brine constitutes the waste brine which is discharged from the saline water conversion system. This fraction of brine is passed from pump 52 through line 56 to brine effluent heat exchanger 58. The cooperation of brine heat exchanger 58 with inlet heat exchanger 18 is similar to that previously described with respect to product water effluent heat exchanger 90 and inlet heat exchanger 19 and, consequently, will not be described in detail. It is likewise desirable to utilize octafluorocyclobutane or whatever refrigerant is employed in freezing zone 42 as the heat exchange fluid in the inlet heat exchangers. This heat exchange medium is circulated between inlet heat exchanger 18 and effluent heat exchanger 58 through lines 25, 29 and 31 by pump 27. By this arrangement, sea water supplied to the saline water conversion plant is cooled by the effluent brine passing upwardly through heat exchanger 58 by direct contact between octafluorocyclobutane, which is circulated between the inlet, and effluent heat exchangers.

It is also desirable to strip any remaining refrigerant or other heat exchange medium from the effluent or waste brine. For this purpose, brine line 105 is connected to effluent heat exchanger 58 adjacent its upper region and conducts the waste brine to spray header 106 of stripper 107. Stripper 107 may be internally similar to stripper 95 previously described and contains a packing material 108 to provide surface for evaporation of any dissolved octafluorocyclobutane. Line 110 is connected between an upper portion of stripper 107 and condenser 99 in order to pass octafluorocyclobutane vapor to condenser 99 for reuse in the system. Line 109 is connected to stripper 107 adjacent its lower region and conducts the waste brine from the saline water conversion system.

It will be appreciated that line 109 conducts a concentrated solution of whatever solvent solution is supplied through line 11 to the inlet of the separation system. It is, therefore, to be understood that the concentrated solvent solution may comprise a valuable by-product of the system, and in some cases may even comprise the primary product of the system depending upon the composition of the solution supplied to the inlet of the separation system.

The deaerator described in connection with the saline water conversion system shown in FIGURE 1 may sometimes be dispensed with, as in cases where the compressor or some other component of the system is capable of removing sufficient dissolved gases from the incoming solution to assure proper freezing of the solution in the freezing chamber.

In FIGURE 2, there is shown an alternate precooler or heat exchanger component which is capable of performing the functions of deaerator 10 as well as heat exchangers 18, 19, 58 and 90 of FIGURE 1. In addition, the device shown in FIGURE 2 is adapted to separate a quantity of fresh water or other solvent material from the entering solution prior to its being passed to the freezing zone.

A combination heat exchanger and deaerator 120 is illustrated in FIGURE 2 as having a casing 121 which has a plurality of transversely extending horizontal partitions 125 and 126 dividing the casing into a first stage 122, a second stage 123 and a third stage 124. While for simplicity heat exchanger 120 is shown as having three stages, it will be understood that, in practice, it might be desirable to employ fifteen to twenty stages in order to achieve maximum heat transfer between the inlet solution and the effluent system fluids.

Each of the stages of the heat exchanger shown in FIGURE 2 are divided into a condensing chamber 127, 129 and 131 and an evaporating chamber 128, 130 and 132 by partitions 133, 134 and 135 in stages 122, 123 and 124 respectively. The partitions prevent flow of liquid from the evaporating chambers to the condensing chambers of the heat exchanger. However, partition 133, for example, extends vertically upwardly in first stage 122 only a portion of the vertical height of the stage so as to form a passage above the partition for vapor to flow from evaporating chamber 128 to condensing chamber 127. Partitions 134 and 135 are similarly constructed for the same purpose in the second and third stages respectively.

Inlet sea water or other solution is supplied under pressure through pipe 11, shown in FIGURE 1, to a spray header 136 of alternate heat exchanger 120, shown in FIGURE 2. The sea water is distributed in evaporating chamber 128 by spray header 136. The evaporating chambers may be provided with a suitable extended surface packing material 151 such as stainless steel wool, if desired. Alternatively, an extended surface comprising discs 152 or folded ribbon 153 or spiral ribbon 154 may be employed. Each of the condensing chambers is provided with a plurality of tubes 137 for the passage of a cold effluent liquid such as brine or fresh water. Heat exchanger condenser tubes 137 serve to provide a relatively low vapor pressure in the first stage of the heat exchanger. Consequently, a quantity of water and dissolved gases, such as air, are flashed out of the sea water supplied to evaporating chamber 128. A purge 138 for noncondensible gases is provided to remove them from the first stage. The condensible water vapor is cooled by heat exchange with the effluent fluids flowing through heat exchange tubes 137 and condensed to a liquid in condensing chamber 127. This condensed liquid, in the case of sea water, comprises fresh water which is then passed through small holes or water passages 139 formed in the bottom of the portion of partition 125 in condensing chamber 127 to condensing chamber 129 of second stage 123. Holes 139 and associated liquid traps 140, as shown in FIGURE 2, are formed in partition 125 to provide a suitable pressure difference between the stages by preventing the passage of water vapor, while being large enough to pass the required amount of condensate. At the same time, the sea water in evaporating chamber 128 of the first stage, which has been partially cooled by flashing, is passed through small holes or brine passages 141 and associated liquid traps 142 formed in the bottom of the portion of partition 125 in evaporating chamber 128 to evaporating chamber 130 of second stage 123. Holes 141 and their associated liquid traps 142 prevent the passage of water vapor between the stages but permit passage of brine from the evaporating chamber of one stage to the next stage.

Heat exchange tubes 137 in evaporating chamber 129 of second stage 123 are operated at a colder temperature than the heat exchange tubes in first stage 122. Consequently, a lower vapor pressure exists in the second stage than in the first stage, and additional water is evaporated from the sea water in evaporating chamber 130. This vapor is passed through the passage formed by partition 134 to heat exchange tubes 137 in evaporating chamber 129 and condensed to form water. This water, together with that previously condensed in condensing chamber 127 and noncondensible gases, is passed through fresh water passages 143 and trap 144 to condensing chamber 131 of third stage 124. At the same time, the further cooled and concentrated sea water remaining in evaporating chamber 130 is passed through brine passages 145 and trap 146 into evaporating chamber 132 of third stage 124, which is operated at a still lower pressure due to the lower temperature of the fluids passing through heat exchange tubes 137 in evaporating chamber 131.

This process of evaporating or flashing water in successively lower temperature and lower pressure stages is continued through any desired number of stages to achieve maximum heat transfer between the effluent liquids flowing through heat exchange tubes 137 in order to recover a fraction of fresh water, while at the same time, precooling the sea water supplied to the inlet of the freezing zone of the saline water conversion system through line 23.

For purposes of illustration, a single inlet line 149 and a single outlet line 150 has been shown for heat exchange tubes 137 which serves to conduct a single effluent fluid, such as brine or product water, through the condensing chambers of the various stages. However, it will be appreciated that to secure maximum heat transfer efficiency and maximum removal of noncondensible gases, such as dissolved air, that it is desirable to circulate the coldest liquids through the last stages and the warmer liquids through the earlier stages of the heat exchanger. In order to achieve this, it is desirable that the very cold effluent waste brine be passed through the last stage of the heat exchanger until it reaches a stage where it is warmed up to about the temperature of the cold effluent product water. In this stage, both brine and product water may be circulated in separate tubes 137 toward the first stage of the heat exchanger in order to obtain maximum precooling of the sea water to conserve the amount of power expended in driving compressor 66 to provide the desired freezing effect in freezing zone 42.

It is desirable to provide a purge line 138 in at least one of the stages of heat exchanger 120. Since a substantial amount of dissolved air will be removed from solution introduced into first stage 122 it is preferable to connect a purge line to the first stage. However, for maximum removal of air, which is desirable for effective operation of the saline water conversion system, it is desirable to also connect a purge line of some type to the last stage 124 of the heat exchanger. As shown in FIGURE 2, line 93, corresponding to the similarly designated product water line in FIGURE 1, is provided to remove both effluent product water and noncondensible gases from the last stage of the heat exchanger. A small bleed port (not shown) may be provided to pass non-condensible gases from intermediate stages to the last stage of the heat exchanger to prevent their accumulation in the intermediate stages. Similarly, brine line 23 shown in FIGURE 2, corresponding to a similarly designated line in FIGURE 1, is provided to pass the cool and concentrated sea water to freezing zone 42 of the saline water conversion plant.

In FIGURE 3, there is shown a modified freezer, separator, melter and condenser vessel 160. Vessel 160 is similar to vessel 40, shown in FIGURE 1, and similar reference characters have been used to designate inlet and outlet lines to the vessel and headers. Vessel 160 is provided with inlet lines 53, 22 and 70 and outlet lines 51, 62, 49, 76, 88 and 85 corresponding to the similarly designated lines in FIGURE 1. Vessel 160 may have a melting plate 198, similar to plate 72 shown in FIGURE 1, but which does not have perforations therein thereby permitting a pressure in condensing chamber 165 different from the pressure in washing chamber 166. This arrangement permits the use of refrigerants having other pressure characteristics such as the compressed vapor of the solvent itself. In the event that plate 198 is not provided with perforations, product water line 88 will be suitably located to receive product water melted above plate 198 as shown in FIGURE 3. Vessel 160 is therefore divided into axally aligned zones or chambers comprising a freezing zone 162; a separating zone 163, including a washing zone 164, a melting zone 166, and a brine separation zone 167; and a condensing zone 165, as shown in FIGURE 3.

However, freezing chamber 162 of vessel 160 differs somewhat from freezing chamber 42 of vessel 40, shown in FIGURE 1, in that inlet solution is supplied by line 22 to a downwardly directed spray header 161 disposed adjacent the upper portion of the freezing chamber or zone. Octafluorocyclobutane or other suitable refrigerant is evaporated from the mixture of solution supplied to freezing zone 162 through line 22 by the withdrawing action of a compressor, the inlet of which is connected to the freezing zone by line 65. Ice is therefore continuously formed in the freezing zone at the top of the column of ice in separating zone 163 of vessel 160 and excess brine is removed through header 50 connected to line 51. Similarly, wash water collector 60 draws melted water from the region of melting plate 198 upwardly through the column of ice to wash the ice in the lower portion of the column free of adhering brine. Line 49 withdraws relatively fresh water seeping up the sides of vessel 160 through collector 48. In other respects, the operation of vessel 160 may be similar to that of vessel 40, shown in FIGURE 1.

The embodiment shown in FIGURE 3 is particularly advantageous because of the relatively small amount of liquid which is required to be recirculated through the separating zone in comparison with the relatively wet slurry freezing and separating zones shown in FIGURE 1. Brine and refrigerant may be passed into freezing zone 162 onto the top of ice in separating zone 163 through header 161 in a quantity which is dependent upon the rate of removal of product water through line 88. Furthermore, the ratio of refrigerant to brine admitted through header 161 may be controlled in a manner to provide relatively little excess brine. Consequently, less brine need be removed through line 51 for proper functioning of the relatively dry separating zone. Since less liquid need be circulated in the type of system shown in FIGURE 3, the pumping and other fluid handling costs are correspondingly reduced. This arrangement is particularly well suited to a direct freeze process wherein water in the brine solution comprises the refrigerant, though octafluorocyclobutane may be used as a refrigerant instead, if desired.

FIGURE 3 additionally illustrates a control arrangement which is also suitable for use with the other illustrated embodiments of this invention. In this control arrangement a salinity control 115 is provided in wash water line 49 and controls the throttling of a valve 116 in product water line 88. A second salinity control 117 is located in wash water line 62 and controls throttling of a second valve 118 in line 88.

Valve 116 serves to create a pressure drop between the point in line 88 to which water line 49 is connected and the portion of line 88 extending from vessel 160. When salinity control 115 senses a predetermined higher than normal brine concentration in the wash water being removed through line 49, it actuates valve 116 toward a more open position. Consequently, the difference in pressure between lines 49, 88 and the side of valve 116 toward vessel 160 is lessened, thereby reducing the flow through line 49 so that the salt concentration in the product water line will not reach an undesirably high value.

Salinity control 117 is set so that when it senses that the brine and water interface in separating zone 163 has dropped down to the level of header 60, this control will actuate valve 118 toward a more closed position. As valve 118 is then more restricted, less product water will be withdrawn through line 88 and, consequently, the brine and water interface will tend to rise in separating zone 163. This assures that the brine and water interface will not drop to such a low point in the vessel that inadequate washing is effected by the time the ice reaches melting zone 166.

The freezer may be operated so that the ice in the upper portion of the separating column 162 is partly above the level of the liquid brine and the ice is frozen by direct contact of the liquid water and liquid refrigerant on the ice. Alternatively, the ice bed may be submerged so that freezing occurs in a slurry above the ice bed, by providing a level control for the liquid brine in line 51.

FIGURES 1 and 3 illustrate combination freezing, separating, washing, melting and condensing chamber or zones which are disposed in a unitary shell or casing. FIGURE 4 illustrates one manner in which these zones may be separated from each other if so desired. In FIGURE 4, there is provided a vessel 175 defining a freezing chamber or zone 176. Freezing zone 176 has a refrigerant vapor outlet 65 adjacent its upper region and may have a partly submerged inlet header 177 for connection to line 22 similar to that shown in FIGURE 1.

In operation, a quantity of refrigerant and brine may be supplied to freezing zone 176 through header 177 from which the refrigerant vaporizes or flashes and passes upwardly in the zone and out through outlet 65. As the refrigerant vaporizes, it causes a portion of the brine in freezing zone 176 to freeze and a slurry of brine and ice is passed through outlet line 178 through slurry pump 179 to a combination separating, melting and condensing vessel 181. Outlet line 178 is disposed a predetermined height above the bottom of freezing chamber 176 to maintain a substantially predetermined level of slurry therein. As in the embodiment of FIGURE 1, partly submerged inlet header 177 functions to distribute solution upwardly in the freezing chamber both directly and by induction. The spray nozzles extending from spray header 177 a predetermined height above the level of slurry in the freezing chamber serve to continuously distribute solution and refrigerant directly upward. The spray nozzles extending from header 177 which are a predetermined distance below the normal level of slurry in the freezing chamber serve to directly project refrigerant and solution upwardly and to induce a substantial quantity of solution and refrigerant in the slurry upwardly to provide the desired extended surface area for evaportion of refrigerant to take place. This combination of submerged and unsubmerged nozzles has been found to be effective in overcoming problems of maldistribution which occasionally arise in the freezing compartment due to transient variations in the substantially predetermined level of slurry which tend to adversely affect the operation of a completely submerged spray header.

Vessel 181 is provided with a brine line 182 for withdrawing brine from the lower portion of the vessel. Slurry is passed into the lower portion of the vessel and brine constituent of the slurry is withdrawn through line 182 from which a portion of it is returned to vessel 175 through line 53 and pump 156. The remaining portion of brine is discharged to waste through line 56 corresponding to the similarly designated line in FIGURE 1.

Vessel 181 is provided with a condensed refrigerant collector header 185, a wash water collector header 186 and a product water collector header 192 which are spaced along the axis of the vessel as shown in FIGURE 4. Vessel 181 is also provided with a plurality of condensing plates or fins 187 and a compressed refrigerant inlet 195. These elements divide vessel 181 into a condensing zone 188, and a separating zone 191 including a washing zone 190, a melting zone 189 and a brine separating zone 197.

In operation, after sufficient slurry has been passed to vessel 181 to provide a vertical column of ice up to the height of plates 187, compressed refrigerant vapor is discharged from compressor 66 through inlet 195 onto the top portion of plates 187. Plates 187 are optional and may comprise generally vertically extending, horizontally spaced plates to improve heat transfer between the hot compressed refrigerant vapor and the cooled ice in vessel 181. The refrigerant vapor, therefore, gives up a portion of its heat to melting the ice and is in turn condensed on the top of plates 187 or on top of the ice in vessel 181.

The melted ice and condensed refrigerant are withdrawn from melting zone 189 through collection headers 192 and 183 and lines 193 and 180 to a suitable location where the product water and refrigerant may be separated by decanting or other suitable means. The refrigerant may then be returned through line 196 to line 22 for reuse in freezing zone 176 and the product water may be forwarded to a suitable effluent heat exchanger. Refrigerant which passes out through effluent or waste brine line 56 may be similarly recovered and the decanted brine may thereafter be stripped as shown in FIGURE 1.

Additional water and a small amount of brine are collected by header 194 and this water or dilute brine serves to wash the ice in vessel 181 free of adhering brine. This dilute brine is forwarded from collector 194 to vessel 175 through line 62 to a pump 156. In addition, brine may be recirculated in vessel 175 through line 155 and pump 156.

The withdrawal of dilute brine through header 194 serves to create a hydraulic force to move ice upwardly in vessel 181 through separating zone 191. In addition, a suitable brine collection header (not shown) having a louvered or screened upper surface may be disposed within the lower region of vessel 181 to withdraw the major fraction of brine in the slurry passed to the vessel through line 178 and to provide the hydraulic force on the ice within the vessel instead of depending upon withdrawal of liquid through header 194. In that case, line 182 will be employed merely to remove refrigerant which accumulates at the bottom of the vessel, assuming that an immiscible refrigerant heavier than water is employed in the system. The brine removed through such a header would be passed partly back to vessel 175 and partly to waste similarly to the arrangement shown in the drawing. It will be appreciated that water may be employed as the refrigerant in either of the embodiments shown in FIGURES 3 and 4 instead of octafluorocyclobutane, if desired, thereby eliminating strippers 95 and 107 shown in FIGURE 1.

It can be seen from the foregoing description that there is provided a system suitable for the separation of the solvent and solute components of a solution which requires a minimum of capital cost, energy input, and operating expense, and which may be extrapolated either upwardly or downwardly to meet the capacity demands of a particular installation. Since a number of functions, such as condensing, washing, separating, melting, and even freezing may be performed in a single vessel the requisite fluid handling costs and piping are reduced to a minimum. Also, a system such as the type described, which utilizes octafluorocyclobutane having a high molecular weight as a refrigerant, and a centrifugal type compressor, is uniquely adapted to the requirements of saline water conversion to provide an efficiency of a very high order without the curtailing effects of previously proposed refrigerant-compressor systems for this purpose, since the compressor may be of relatively simple and inexpensive construction. It will be understood that various modifications shown in the several drawing figures may be alternately embodied in the apparatus of other figures, if desired.

Other advantages and modifications of the described invention will readily occur to those skilled in the art, and it is to be understood that the illustrated embodiments are intended merely to show examples of preferred methods and apparatus for the accomplishment of these objectives.

We claim:

1. In a process for desalting a brine solution, the steps consisting of precooling said brine, commingling said brine with liquid octafluorocyclobutane, vaporizing octafluorocyclobutane from said brine to form ice from a portion of the water in said brine, passing said ice to a separating zone, melting a portion of said ice to form water, passing a portion of the water formed from melting said ice in counterflow to the direction of movement of said ice in said separating zone to displace adhering brine from the surface of the ice to wash the ice free of said brine, and melting additional washed ice to form product water.

2. A process as defined in claim 1 including the step of compressing said vaporized octafluorocyclobutane, and wherein the step of melting said ice to form water includes passing the compressed octafluorocyclobutane vapor into direct contact with ice in said separating zone to melt said ice and condense said octafluorocyclobutane vapor.

3. In a process for separating a solvent liquid from a salt dissolved in a solution thereof having a vapor pressure less than the vapor pressure of octafluorocyclobutane, the steps consisting of: passing said solution to a freezing zone, passing liquid octafluorocyclobutane to said freezing zone so as to provide a mixture of said octafluorocyclobutane and said solution in said freezing zone, withdrawing octafluorocyclobutane vapor from said freezing zone in a quantity sufficient to evaporate octafluorocyclobutane from the mixture thereof with said solution and to produce a sufficiently low temperature to freeze a portion of said solvent in said solution, passing frozen solvent from said freezing zone to a separating zone and separating the frozen solvent from adhering solution in the separation zone by replacing the adhering solution with a liquid which is relatively free of said dissolved salt.

4. An apparatus for the separation of a dissolved salt from a solvent in a solution thereof having a vapor pressure less than the vapor pressure of octafluorocyclobutane comprising a freezing zone, means to pass said solution to said freezing zone, means to pass liquid octafluorocyclobutane to said freezing zone, said octafluorocyclobutane forming a mixture with said solution, a compressor for withdrawing octafluorocyclobutane vapor from said freezing zone in a quantity sufficient to vaporize octafluorocyclobutane from the mixture in said freezing zone and to provide a temperature such that only a portion of the solvent in said solution is frozen, means to pass said frozen solvent from said freezing zone to a separation zone and means to replace salt solution adhering on the surfaces of said frozen solvent in said separation zone with a liquid which is relatively free of said dissolved salt to thereby provide a quantity of solvent which is relatively uncontaminated with said salt.

5. A freezing apparatus for use with a freeze type system for the separation of the solvent and solute components of a solution comprising a compressor, a vessel defining a freezing chamber having a mixture of said solution and a refrigerant therein, passage means for admitting refrigerant vapor from said freezing chamber to said compressor, an outlet line from said vessel having one end thereof terminating a predetermined distance from the bottom of said freezing chamber to maintain a substantially predetermined solution height therein, and a partially submerged solution inlet header for introducing solution into said freezing chamber and for projecting upwardly a mixture of refrigerant and solution in said chamber to increase the exposed surface area of said mixture and to promote evaporation of refrigerant from the mixture upon operation of said compressor, said header comprising a spray nozzle disposed a distance above the substantially predetermined level of solution in said freezing chamber to provide continuous distribution of solution irrespective of transient variations in the substantially predetermined level thereof in said freezing chamber, and another spray nozzle disposed a predetermined distance below said substantially predetermined level of solution in said freezing chamber to distribute upwardly in said chamber by induction a portion of the mixture of solution and refrigerant therein.

6. A control arrangement for a saline water conversion plant of the type having means to freeze water out of a brine solution, means to pass water through the resulting ice and brine mixture in a washing zone to displace brine adhering to the surface and in the interstices of said ice, means to withdraw the wash water from the washing zone, means to melt the washed ice in a melting zone and means comprising a product water line to withdraw the relatively pure product water obtained from melting said ice, said control arrangement comprising a salinity control responsive to the salt concentration of the wash water withdrawn from said washing region, a throttling valve for controlling the rate of removal of product water from said melting zone, said salinity control serving to reduce the quantity of product water withdrawn upon sensing by said salinity control of a predetermined excess degree of salinity in the wash water withdrawn from said washing zone, said means to withdraw wash water from the washing zone including additional means to withdraw relatively pure wash water bypassing about the peripheral edges of the ice in said washing zone separately from said wash water passing through said ice and brine mixture, means to pass said relatively pure bypassing wash water from said system for use at a desired location, and means automatically responsive to the degree of salinity of said bypassing wash water for controlling the ratio of product water to bypassing wash water withdrawn from said system.

7. An apparatus for the separation of the solvent and solute components of a solution comprising means defining a freezing chamber adapted to contain a mixture of said solution with a substantially immiscible refrigerant, a compressor for vaporizing and withdrawing refrigerant vapors from said freezing chamber to freeze a portion of the solvent and form a slurry of solution and frozen solvent therein, means defining a condensing zone, means defining a separating zone, means to pass said slurry of solution and frozen solvent from said freezing chamber to said separating zone, means to pass refrigerant vapor from said compressor to said condensing zone in heat exchange relation with frozen solvent to condense said immiscible refrigerant and to melt said frozen solvent, means to withdraw a portion of said melted solvent from said condensing zone, means to pass additional melted solvent through said frozen solvent in said separting zone to wash adhering solution from said frozen solvent in said separating zone, a vessel comprising an evaporating chamber and a condensing chamber, said evaporating chamber and said condensing chamber being in vapor communication with each other, means to pass solution to said evaporating chamber, means to pass relatively cool concentrated solution from an outlet of said separating zone into heat exchange relation with fluid in said condensing chamber to maintain a sufficiently low vapor pressure therein to flash some of the solvent constituent of said solution and to remove air from said solution, means to purge said condensing chamber, means to pass cooled and deaerated solution from said evaporating chamber to said freezing chamber for freezing therein, and means to withdraw the relatively pure condensed solvent from said condensing chamber.

References Cited by the Examiner

UNITED STATES PATENTS

| | | | |
|---|---|---|---|
| 2,759,882 | 8/1956 | Worthen | 202—174 |
| 2,821,304 | 1/1958 | Zarchin | 62—58 |
| 2,854,494 | 9/1958 | Thomas. | |
| 2,890,962 | 6/1959 | Eddy. | |
| 2,891,099 | 6/1959 | Skinner. | |
| 2,896,419 | 7/1959 | Thompson | 62—58 |
| 2,908,618 | 10/1959 | Bethon | 202—174 |
| 2,967,693 | 1/1961 | Cunningham et al. | |
| 2,981,773 | 4/1961 | Weedman. | |
| 2,997,856 | 8/1961 | Pike | 62—58 |
| 3,006,609 | 10/1961 | Anthony. | |
| 3,017,751 | 1/1962 | Hawkins | 62—123 |
| 3,017,752 | 1/1962 | Findlay | 62—58 |
| 3,027,320 | 3/1962 | Buchanan | 62—58 X |
| 3,098,733 | 7/1962 | Rosenstein | 62—58 |
| 3,103,792 | 9/1963 | Davids. | |
| 3,119,772 | 1/1964 | Hess | 62—58 |

FOREIGN PATENTS

| | | |
|---|---|---|
| 176,499 | 3/1922 | Great Britain. |
| 841,374 | 7/1960 | Great Britain. |
| 70,507 | 6/1946 | Norway. |

NORMAN YUDKOFF, *Primary Examiner.*
ROBERT F. BURNETT, RICHARD A. O'LEARY,
*Examiners.*
D. R. MATTHEWS, *Assistant Examiner.*